Figure 1:
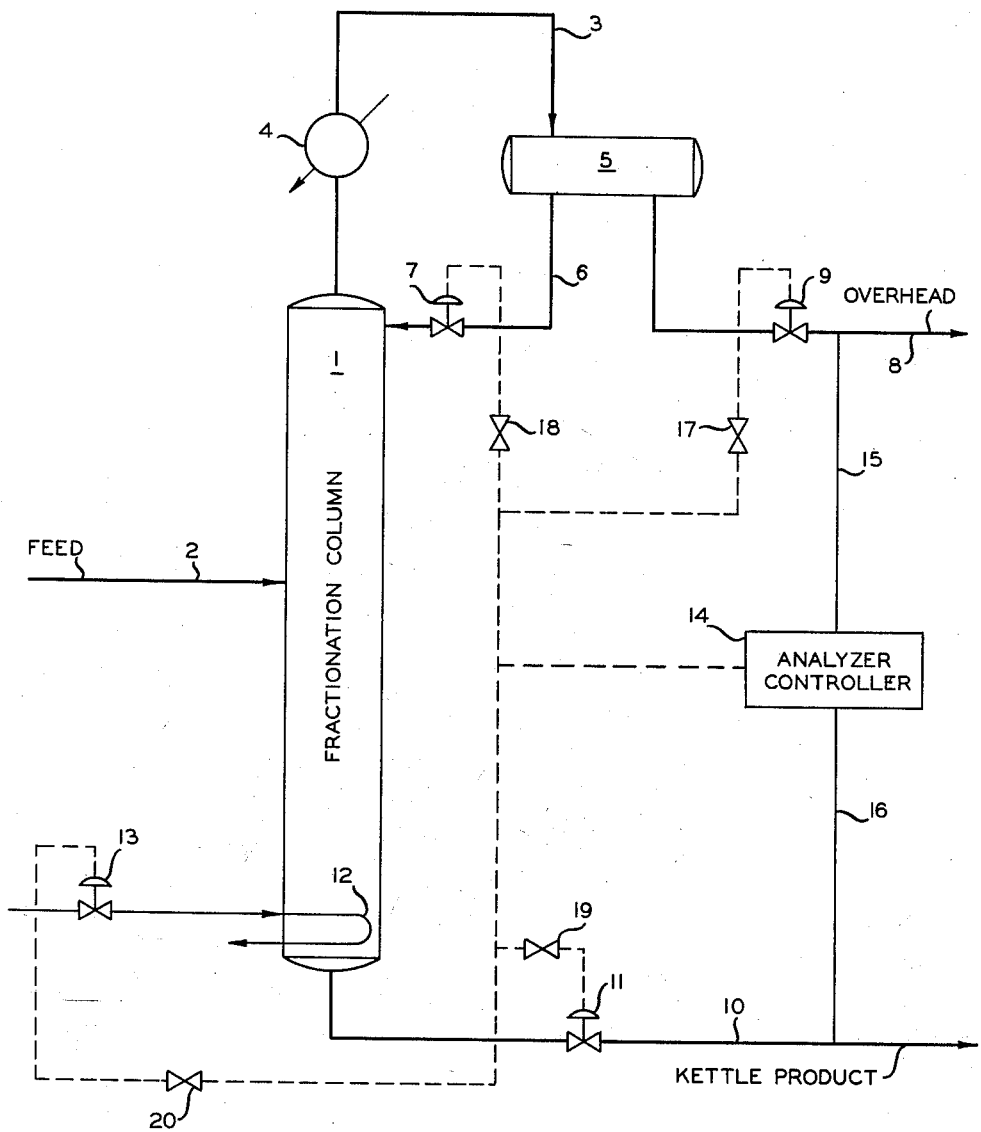

INVENTOR.
O. D. LARRISON

United States Patent Office 3,156,628
Patented Nov. 10, 1964

3,156,628
DISTILLATION PROCESS CONTROLLED BY THE CONCENTRATION OF AN IMPURITY IN THE PRODUCT STREAMS
Owen D. Larrison, Phillips, Tex., assignor to Phillips Petroleum Company, a corporation of Delaware
Filed Apr. 21, 1961, Ser. No. 104,750
14 Claims. (Cl. 202—40)

This invention relates to method and apparatus for fractionation. In one of its aspects, the invention relates to method and apparatus adapted to maintain a constant ratio of impurities in an overhead stream as related to impurities in a kettle stream. In another aspect, the invention relates to method and apparatus for controlling a fractional separation so as to utilize more efficiently the separation equipment. In still another aspect, this invention relates to method and apparatus for controlling a fractionation so as to maintain a constant ratio of "loss" in an overhead stream to "loss" in a kettle stream. In yet another aspect, this invention relates to method and apparatus for fractionation control wherein the ratio of the concentration of a light component in the kettle product to the concentration of a heavy component in the overhead product is maintained at a predetermined value by manipulating an operating variable of the column, such as overhead product rate, kettle product rate, reflux rate, or steam rate.

Distillational separations have, in the past, been controlled in various manners. According to the particular situation, it may be desired to maintain at a minimum the concentration of a given component in a product stream. Thus, for example, in a fractionation wherein the overhead product is the most valuable, the concentration of this overhead stream is often controlled so as to provide the highest purity possible under the conditions. In this situation, the load in the stripping section will remain relatively constant, while the load in the reboiling section will vary from overload to well below capacity, depending, for example, on feed composition. On the other hand, there are situations wherein the fractionation is controlled so as to keep to a minimum the product of value in a given product stream. In the past, it has been the general practice to control a fractionation in such a manner that the desired minimum purity is maintained in one given product stream, i.e., the purity of either the overhead stream, the kettle product, or a side stream is maintained above a desired value and the compositions of the other streams are allowed to go as they will. This has been accomplished in various manners such as manipulation of side stream, kettle product, or overhead product withdrawal rate or reflux or steam rate. Further, attempts have been made to maintain at a constant level the purity of both overhead and kettle products simultaneously.

It is an object of this invention to provide method and apparatus for controlling a fractionation wherein there is maintained constant the ratio of the concentration of a heavy component in an overhead stream to the concentration of a light component in a kettle stream. It is another object of this invention to provide method and apparatus wherein a fractional separation is controlled so as to maintain at a fixed predetermined value the ratio of "loss" of a heavy component in an overhead stream to "loss" of a light component in a kettle stream.

Figure 2:
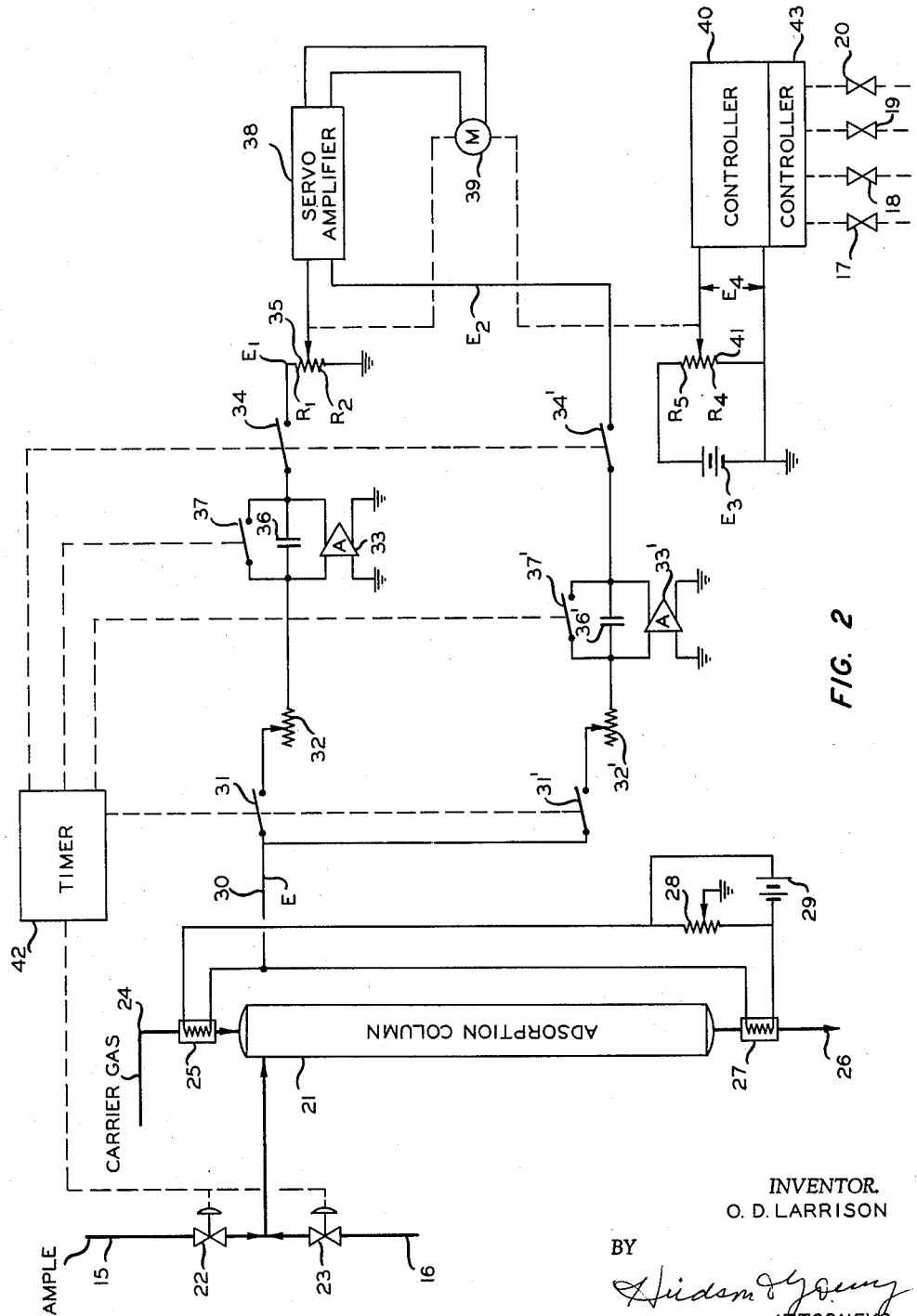

Other aspects, objects and advantages of the invention will become apparent from examination of this specification and the appended claims taken in conjunction with the accompanying drawing in which: FIGURE 1 is a depiction of a fractionation apparatus and control system according to subject invention; FIGURE 2 is a detailed description of one embodiment of the analysis and control system of subject invention.

According to my invention, there are provided a method and apparatus for controlling a fractional separation of a multi-component fluid mixture which comprises determining the amount of a heavy component in the fractionation overhead stream and producing a first signal proportional thereto, determining the amount of a light component in the fractionation kettle product stream and producing a second signal proportional thereto, producing a third signal proportional to the ratio of said first signal to said second signal, and controlling in response to said third signal a variable of said distillation so as to maintain said ratio at a predetermined value. The afore-mentioned variable can be, for example, the rate of heat introduction into the fractionation column, the fractionation reflux rate, the overhead product withdrawal rate, or the kettle product withdrawal rate. There is also provided according to the invention method and means for analyzing the afore-mentioned overhead product and kettle product streams and for producing in response to the analyses a control signal representative of the "loss" ratio and for controlling the fractionation in response thereto. In one embodiment of the invention, the analysis is conducted by a chromatography apparatus. In another embodiment of the invention, the column control is effected by a conventional, i.e., commercially available, controller, while in still another embodiment the control is effected by an optimal controller.

Referring now to the drawing, and to FIGURE 1 in particular, there is shown a fractionation column 1 having conventional vapor-liquid contacting means therein. A multi-component feed mixture is introduced into the column by way of conduit 2. Vapors produced by the fractionation are taken overhead by way of conduit 3 and cooled in condenser 4, and then passed to accumulation zone 5. A portion of the condensed overhead vapors are returned to the fractionation column as reflux by way of conduit 6 having valve 7 located therein. A second portion of the condensed overhead product is withdrawn as a product of the process by way of conduit 8 having a valve 9 located therein. The heavier portion of the feed stream is withdrawn from a lower portion of the fractionation column by way of conduit 10 having a valve 11 therein, and is commonly known as kettle product. Heat is supplied to the fractionation column by means of heating coil 12 having a valve 13 shown therein, although it is understood that direct, rather than indirect, heat exchange is also contemplated to cause the necessary reboiling. Operation of the column is controlled according to the invention by an analyzer-controller shown generally as 14. This analyzer-controller receives a sample of overhead product by way of conduit 15 and a sample of kettle product by way of conduit 16. Although these conduits are shown as being connected to conduits 8 and 10, respectively, it is obvious that they may be connected instead to, for example, conduits 3 or 6 and/or an upper and a lower portion of the fractionation column 1. The output of analyzer-controller 14 is shown as being connected by pneumatic lines to the respective valves 7, 9, 11 and 13. These lines have therein blocking valves 17, 18, 19 and 20, respectively. Thus, by suitable manipulation of these blocking valves, the output of analyzer-controller 14 can be made to manipulate any one or combination of the valves 7, 9, 11, and 13 as desired. In one presently preferred embodiment, the output of controller 14 is connected only to valve 13 by opening valve 20 and closing valves 17, 18 and 19. As will become obvious, however, the valves 7, 9, 11 and 13 can be operated in other combinations according to the separation being made. Operation of analyzer-controller 14 will now be explained in detail according to one embodiment by reference to FIGURE 2.

Referring now to FIGURE 2, there is provided an absorption column 21 known generally in the art as a chromatography column. This column has the property of preferentially retarding various components of a mixture introduced therein. The sample mixture is introduced into column 21 sequentially by way of conduits 15 and 16 (corresponding to like numerals in FIGURE 1). Flow through these conduits 15 and 16 is controlled in response to a timed signal by valves 22 and 23. A carrier gas is introduced into the column by way of conduit 24. This carrier gas can be helium, nitrogen or another hydrogen or any gas inert to the system. Interposed in conduit 24 is a thermally sensitive resistance element 25. The sample introduced is carried by the carrier gas through column 21 and leaves the column by way of conduit 26 having interposed therein a second thermally sensitive resistance element 27. Resistance elements 25 and 27 are connected in series relationship to form two adjacent arms of a bridge network. A potentiometer 28 forms the opposite two arms of the bridge network. A voltage source 29 is connected across the end terminals of potentiometer 28. The contactor of potentiometer 28 is connected to ground, and the junction between resistance elements 25 and 27 is connected to an electrical lead 30 which provides an output signal of voltage E, taken with respect to ground.

As previously mentioned, valves 22 and 23 are opened periodically by means of a timer 42 to introduce predetermined volumes of the sample gas into column 21. The carrier gas tends to force the sample through the column so that the effluent from the column begins to contain a less readily adsorbed component at the end of a time $t_1$ and a more readily adsorbed component at the end of a time $t_3$. The output voltage E increases when the constituents appear in the effluent due to the difference in thermal conductivity of the gases flowing past resistance elements 25 and 27.

Conductor 30 is connected through a switch 31 and an attenuating potentiometer 32 to the first input terminal of an operational amplifier 33, the second input terminal of amplifier 33 being connected to ground. The first output terminal of amplifier 33 is connected through a switch 34 and a potentiometer 35 to ground. A capacitor 36 is connected between the first input and output terminals of amplifier 33, and a switch 37 is connected in parallel with capacitor 36. Amplifier 33 is conventional high-gain D.C. amplifier. When switch 37 is open, the output voltage $E_1$ of the amplifier is represented by the expression:

$$E_1 = \frac{1}{T} \int^t E\,dt$$

where $t$ is time and $T$ is the time constant of capacitor 36 and its associated circuit. This circuit thus constitutes a first integration unit.

A second integration unit is also connected to lead 30. This second unit is similar to the one previously described and corresponding elements are designated by like primed reference numerals. The first output terminal of amplifier 33' is connected through switch 34' to the first input terminal of a servo amplifier 38, which can be of the type described in The Electronic Control Handbook, Batcher and Moulic, Caldwell-Clements, Inc., New York, 1946, page 298. The second input terminal of amplifier 38 is connected to the contractor of a potentiometer 35. The output of amplifier 38 energizes a reversible motor 39 which has the drive shaft thereof mechanically connected to the contactor of potentiometer 35. The drive shaft of motor 39 is also mechanically connected to the contactor of a potentiometer 41 which has a voltage source $E_3$ connected across the end terminals thereof. The contactor and one end terminal of potentiometer 41 are connected to the respective input terminals of controller 40.

In order to describe the operation of the comparison circuit, the portions of potentiometer 35 above and below the contactor are designated as resistances $R_1$ and $R_2$, respectively. The portions of potentiometer 41 above and below the contactor are designated by resistances $R_5$ and $R_4$, respectively. The current flowing from the output of amplifier 33 through resistor $R_1$ and resistor $R_2$ to ground is designated $i_1$. The current flowing from the output of amplifier 33' through the input of amplifier 38 and resistor $R_2$ to ground is designated $i_2$. The following equations should thus become apparent.

$$E_1 = i_1(R_1+R_2)+i_2R_2$$

$$E_2 = i_1R_2+i_2R_2$$

The ratio can be expressed:

$$\frac{E_1}{E_2} = \frac{i_1(R_1+R_2)+i_2R_2}{i_1R_2+i_2R_2}$$

At null, $i_2=0$, so that:

$$\frac{E_1}{E_2} = \frac{R_1+R_2}{R_2} = \frac{R_4+R_5}{R_4} = \frac{E_3}{E_4}$$

This can be expressed:

$$E_4 = \frac{E_2(E_3)}{E_1} = k\frac{E_2}{E_1}$$

where $k$ is a constant:

The output voltage $E_4$ which is applied to controller 40 is thus representative of the ratio of the output signals from amplifiers 33 and 33'.

Switches 31, 31', 37, 37', 34 and 34' are operated by a timer 42 so that the output signals from amplifiers 33 and 33' represent the concentrations of light component and heavy component, respectively, in the sample gas. Timer 42 can comprise a plurality of cams which are rotated by a constant speed motor. These cams operate the switches in the sequence described hereinafter. Switch 31 is closed at time $t_1$. Switches 37 and 37' are open at this time. At time $t_2$ switch 31 is opened. At time $t_3$ switch 31' is closed. At time $t_4$ switch 31' is opened. At time $t_5$ switches 34 and 34' are closed so that the output signals of amplifiers 33 and 33' which are stored on respective capacitors 36 and 36' are applied to the comparison circuit. At time $t_6$ switches 37 and 37' are closed momentarily to discharge the capacitors and to prepare the unit for a subsequent analysis cycle.

Controller 40 can be any conventional commercially available unit which converts an input electrical voltage into a corresponding output pneumatic pressure. A transducer of this type is described in Bulletin A-710, the Swartwout Company, Cleveland, Ohio, for example. This pneumatic signal resets flow controller 43, which can be of the type described in Bulletin 5A-10A, the Foxboro Company, Foxboro, Massachusetts, for example.

The output of controller 43 is applied as desired by manipulation of valves 17, 18, 19 and 20, as previously described in connection with FIGURE 1.

Although FIGURE 2 has been described as providing voltages $E_1$ and $E_2$, as proportional to heavy and light components, respectively, present in samples from conduits 15 and 16 by proper manipulation of valves 22 and 23, it will be obvious that adsorption column 21 could also be duplicated in order to provide a voltage E proportional to heavy component in sample 15 and a second voltage $E_1$ proportional to light component in sample 16.

According to this embodiment, the previously-described ratio of heavy component in the overhead to light component in the kettle product is maintained at a maximum or minimum by controller 43, as desired.

In order to more fully describe the invention, reference is now made to the following specific example wherein fractionation column 1 is a debutanizer. Conditions obtained in column 1 are set forth in the following table:

Table I

| | |
|---|---:|
| Top temperature | 167 |
| Bottom temperature | 283 |
| Top pressure | 135 |
| Bottom pressure | 140 |
| Diameter of column in feet | 12 |
| Reflux to feed ratio | 1.0 |

Ratio of concentration of $nC_4$ in K.P. to $iC_5$ in O.H.P.

$$=1.3808=\frac{\frac{1,265}{451,900}}{\frac{1,265}{624,050}}$$

| | |
|---|---:|
| Feed rate, g.p.d | 1,075,950 |
| K.P., g.p.d | 451,900 |
| O.H.P | 624,050 |

| | Debutanizer, g.p.d. | | |
|---|---|---|---|
| | Feed | O.H.P. | K.P. |
| $C_2$ | 10,760 | 10,760 | |
| $C_3$ | 215,190 | 215,190 | |
| $iC_4$ | 96,835 | 96,835 | |
| $nC_4$ | 301,265 | 300,000 | 1,265 |
| $iC_5$ | 129,115 | 1,265 | 127,850 |
| $nC_5$ | 139,875 | | 139,875 |
| $C_6+$ | 182,910 | | 182,910 |
| | 1,075,950 | 624,050 | 451,900 |

In the preceding example, the ratio to be maintained constant is that of the concentration of normal butane in the kettle product to concentration of isopentane in the overhead product. The ratio, as shown above, is maintained at 1.3808. In this instance, controller 43 is the Foxboro controller, previously described.

Although the invention has been described in conjunction with a chromatography column for analyzing the concentration of components in the streams of interest, it is understood that other analyzers can be suitable. Infrared, ultra-violet, and mass spectrometer analyzers are also within the purview of this invention.

There has thus been described method and apparatus advantageous in obtaining a maximum throughput rate in a fractionation column. When a column is operated so as to maintain a given purity of either overhead or kettle product, the entire column is not utilized to advantage. For example, if a 99.5 percent pentane overhead product is desired and the column operated so as to produce this product, the stripping section of the column will operate at a relatively constant load. However, the reboiling section of the column can be either overloaded or below capacity, depending, for example, on feed composition. According to my invention, the load on the column is "balanced" in accordance with the predetermined ratio.

Reasonable variation and modification are possible within the scope of the foregoing disclosure, the drawings and the appended claims to the invention, the essence of which is that there is provided method and apparatus for controlling fractional separation wherein there is maintained constant the ratio of the concentration of a light component in the kettle to the concentration of a heavy component in the overhead.

I claim:

1. The method of controlling distillation separation of a multi-component heavier fluid from a multi-component lighter fluid comprising passing a mixture of said heavier fluid and said lighter fluid to a fractionation zone, heating said mixture in said zone to cause separation by vaporization of said lighter fluid from said heavier fluid, withdrawing said lighter fluid as vapor from an upper portion of said zone, cooling the withdrawn lighter fluid to cause condensation thereof, returning a portion of said withdrawn lighter fluid to an upper portion of said zone as reflux, removing another portion of said withdrawn lighter fluid as a product of the separation, withdrawing said heavier fluid from a lower portion of said zone as another product of the separation, determining as impurity the concentration of a heavier component in the withdrawn lighter fluid and producing a first signal proportional thereto, determining as impurity the concentration of a lighter component in the withdrawn heavier fluid and producing a second signal proportional thereto, producing a third signal proportional to the ratio of said first signal to said second signal, and controlling in response to said third signal the rate of said returning said portion of said withdrawn lighter fluid.

2. The method of controlling fractional distillation of a multi-component liquid stream having at least three components which comprises passing said stream to a fractionation zone, introducing heat into a lower portion of said zone, withdrawing from an upper portion of said zone a stream comprising a light component of said stream containing as impurity a minor amount of a heavier component of said stream as a product of the distillation, withdrawing from a lower portion of said zone a stream comprising a heavy component of said stream containing as impurity a minor amount of a lighter component of said stream as a second product of the distillation, measuring the concentration of heavier component in said stream comprising a light component and producing a first signal proportional thereto, measuring the concentration of lighter component in said stream comprising a heavy component and producing a second signal proportional thereto, producing a third signal proportional to the ratio of said first signal to said second signal, and controlling in response to said third signal a process variable which affects the said distillation so as to maintain said ratio at a predetermined value whereby the said fractional distillation is maintained in balanced condition.

3. The method of claim 2 wherein said process variable comprises the rate of introducing said heat.

4. The method of claim 2 wherein said process variable comprises the rate of withdrawing said stream comprising a light component.

5. The method of claim 2 wherein said process variable comprises the rate of withdrawing said stream comprising a heavy component.

6. The method of controlling fractional distillation of a multi-component fluid mixture wherein there is obtained a fractionation overhead stream and a fractionation kettle product stream which comprises determining as impurity the concentration of a heavy component not desired in the said fractionation overhead stream and producing a first signal proportional thereto, determining as impurity the concentration of a light component not desired in the said fractionation kettle product stream and producing a second signal proportional thereto, producing a third signal proportional to the ratio of said first signal to said second signal, and controlling in response to said third signal a process variable which affects the said distillation so as to maintain said ratio at a predetermined value whereby the said fractional distillation is maintained in a desired balanced condition.

7. The method of claim 6 wherein said process variable comprises the rate of heat introduction into said fractional distillation.

8. The method of claim 6 wherein said process variable comprises the rate of supplying a reflux stream to said fractional distillation.

9. The method of claim 6 wherein said process variable comprises the rate of withdrawing said fractionation overhead stream.

10. The method of claim 6 wherein said process variable comprises the rate of withdrawing said fractionation kettle product stream.

11. The method of controlling fractional distillation of a multi-component fluid mixture wherein there is obtained a fractionation overhead stream and a fractionation kettle product stream which comprises determining as impurity the concentration of a first component not desired in the said fractionation overhead stream and producing a first signal proportional thereto, determining as impurity the concentration of a different component not desired in the said fractionation kettle product stream and producing a second signal proportional thereto, producing a third signal proportional to the ratio of said first signal to said second signal, and controlling in response to said third signal a process variable which affects the said distillation so as to maintain said ratio at a predetermined value whereby the said fractional distillation is maintained in a desired balanced condition.

12. The method of controlling distillation separation of a multi-component heavier fluid from a multi-component lighter fluid comprising passing a mixture of said heavier fluid and said lighter fluid to a fractionation zone, heating said mixture in said zone to cause separation by vaporization of said lighter fluid from said heavier fluid, withdrawing said lighter fluid as vapor from an upper portion of said zone, cooling the withdrawn lighter fluid to cause condensation thereof, returning a portion of said withdrawn lighter fluid to an upper portion of said zone as reflux, removing another portion of said withdrawn lighter fluid as a product of the separation, withdrawing said heavier fluid from a lower portion of said zone as another product of the separation, determining as impurity the concentration of a heavier component in the withdrawn lighter fluid and producing a first signal proportional thereto, determining as impurity the concentration of a lighter component in the withdrawn heavier fluid and producing a second signal proportional thereto, producing a third signal proportional to the ratio of said first signal to said second signal, and controlling in response to said third signal the rate of said removing another portion of said withdrawn lighter fluid.

13. The method of controlling distillation separation of a multi-component heavier fluid from a multi-component lighter fluid comprising passing a mixture of said heavier fluid and said lighter fluid to a fractionation zone, heating said mixture in said zone to cause separation by vaporization of said lighter fluid from said heavier fluid, withdrawing said lighter fluid as vapor from an upper portion of said zone, cooling the withdrawn lighter fluid to cause condensation thereof, returning a portion of said withdrawn lighter fluid to an upper portion of said zone as reflux, removing another portion of said withdrawn lighter fluid as a product of the separation, withdrawing said heavier fluid from a lower portion of said zone as another product of the separation, determining as impurity the concentration of a heavier component in the withdrawn lighter fluid and producing a first signal proportional thereto, determining as impurity the concentration of a lighter component in the withdrawn heavier fluid and producing a second signal proportional thereto, producing a third signal proportional to the ratio of said first signal to said second signal, and controlling in response to said third signal the rate of said withdrawing said heavier fluid.

14. The method of controlling distillation separation of a multi-component heavier fluid from a multi-component lighter fluid comprising passing a mixture of said heavier fluid and said lighter fluid to a fractionation zone, heating said mixture in said zone to cause separation by vaporization of said lighter fluid from said heavier fluid, withdrawing said lighter fluid as vapor from an upper portion of said zone, cooling the withdrawn lighter fluid to cause condensation thereof, returning a portion of said withdrawn lighter fluid to an upper portion of said zone as reflux, removing another portion of said withdrawn lighter fluid as a product of the separation, withdrawing said heavier fluid from a lower portion of said zone as another product of the separation, determining as impurity the concentration of a heavier component in the withdrawn lighter fluid and producing a first signal proportional thereto, determining as impurity the concentration of a lighter component in the withdrawn heavier fluid and producing a second signal proportional thereto, producing a third signal proportional to the ratio of said first signal to said second signal, and controlling in response to said third signal the rate of said heating.

References Cited in the file of this patent
UNITED STATES PATENTS

| | | |
|---|---|---|
| 2,709,678 | Berger | May 31, 1955 |
| 2,749,281 | Ferro | June 5, 1956 |
| 2,764,536 | Hutchins | Sept. 25, 1956 |
| 2,881,235 | Van Pool | Apr. 7, 1959 |
| 2,977,289 | Kron | Mar. 28, 1961 |
| 2,990,437 | Berger | June 27, 1961 |
| 2,994,646 | Kleiss | Aug. 1, 1961 |
| 2,995,544 | Bourgeois | Aug. 8, 1961 |
| 3,018,230 | Morgan | Jan. 23, 1962 |